(12) United States Patent
Trivedi et al.

(10) Patent No.: US 7,774,298 B2
(45) Date of Patent: Aug. 10, 2010

(54) METHOD AND SYSTEM FOR DATA EXTRACTION FROM A TRANSACTION SYSTEM TO AN ANALYTICS SYSTEM

(75) Inventors: Vishal Trivedi, Bangalore (IN); Venkiteswaran B. Vadakkencherry, Bangalore (IN)

(73) Assignee: SAP AG, Walldorf (DE)

( * ) Notice: Subject to any disclaimer, the term of this patent is extended or adjusted under 35 U.S.C. 154(b) by 998 days.

(21) Appl. No.: 10/880,861

(22) Filed: Jun. 30, 2004

(65) Prior Publication Data
US 2006/0004833 A1 Jan. 5, 2006

(51) Int. Cl.
*G06F 17/30* (2006.01)
(52) U.S. Cl. .................. 707/600; 707/602; 707/607; 707/610; 707/611; 707/615; 707/625; 707/646
(58) Field of Classification Search .................. 707/100, 707/101, 104.1, 10, 600, 602, 607, 610, 611, 707/615, 625, 646; 705/1, 7
See application file for complete search history.

(56) References Cited

U.S. PATENT DOCUMENTS

| | | | | |
|---|---|---|---|---|
| 5,752,002 A * | 5/1998 | Naidu et al. | ............... | 703/14 |
| 5,864,848 A * | 1/1999 | Horvitz et al. | ............... | 707/6 |
| 5,873,096 A * | 2/1999 | Lim et al. | ............... | 707/201 |
| 6,151,601 A * | 11/2000 | Papierniak et al. | ............... | 707/10 |
| 6,430,565 B1 * | 8/2002 | Berger et al. | ............... | 1/1 |
| 6,493,728 B1 * | 12/2002 | Berger | ............... | 707/202 |
| 6,684,206 B2 * | 1/2004 | Chen et al. | ............... | 707/3 |
| 6,801,921 B2 * | 10/2004 | Tsuchida et al. | ............... | 707/204 |
| 6,931,418 B1 * | 8/2005 | Barnes | ............... | 1/1 |
| 6,931,598 B2 * | 8/2005 | Price et al. | ............... | 715/760 |
| 7,133,876 B2 * | 11/2006 | Roussopoulos et al. | ............... | 707/102 |
| 7,171,406 B2 * | 1/2007 | Chen et al. | ............... | 707/3 |
| 7,269,581 B2 * | 9/2007 | Petculescu et al. | ............... | 1/1 |
| 7,333,982 B2 * | 2/2008 | Bakalash et al. | ............... | 1/1 |
| 2001/0034686 A1 * | 10/2001 | Eder | ............... | 705/36 |
| 2002/0083067 A1 * | 6/2002 | Tamayo et al. | ............... | 707/100 |
| 2002/0107876 A1 * | 8/2002 | Tsuchida et al. | ............... | 707/202 |
| 2002/0107878 A1 * | 8/2002 | Tsuchida et al. | ............... | 707/204 |
| 2002/0138316 A1 * | 9/2002 | Katz et al. | ............... | 705/7 |
| 2002/0174185 A1 * | 11/2002 | Rawat et al. | ............... | 709/206 |
| 2003/0050930 A1 * | 3/2003 | Mosher et al. | ............... | 707/9 |
| 2003/0084075 A1 * | 5/2003 | Balogh et al. | ............... | 707/204 |
| 2003/0158831 A1 * | 8/2003 | Zaremba | ............... | 707/1 |
| 2004/0078461 A1 * | 4/2004 | Bendich et al. | ............... | 709/224 |
| 2004/0254926 A1 * | 12/2004 | Balogh | ............... | 707/4 |
| 2005/0209876 A1 * | 9/2005 | Kennis et al. | ............... | 705/1 |
| 2008/0183740 A1 * | 7/2008 | Arras et al. | ............... | 707/101 |

* cited by examiner

*Primary Examiner*—Don Wong
*Assistant Examiner*—Thanh-Ha Dang
(74) *Attorney, Agent, or Firm*—Kenyon & Kenyon LLP

(57) ABSTRACT

The present invention provides a method and system for the automatic extraction of data from a transaction system to an analytics system, which is capable of handling large volumes of application data.

21 Claims, 13 Drawing Sheets

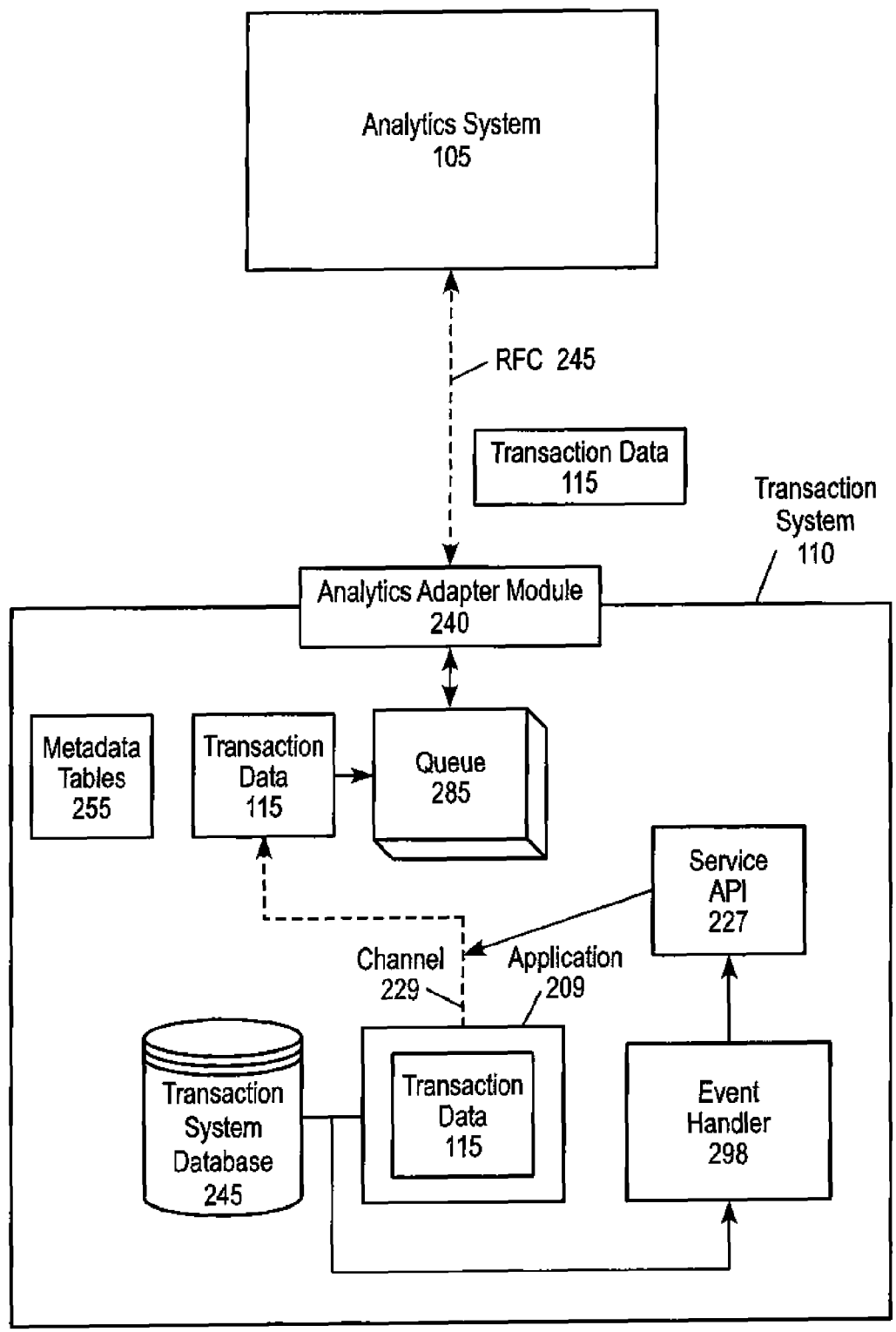

METHOD AND SYSTEM FOR DATA EXTRACTION FROM A TRANSACTION SYSTEM TO AN ANALYTICS SYSTEM

FIELD OF THE INVENTION

The present invention relates to the areas of computer software, software engineering and development. In particular, the present invention provides a method and system for extraction of data from an application on a transaction system to an analytics system. The method and system provides generic extraction services for arbitrary data types and is capable of handling voluminous data generation by avoiding the use of a middleware channel.

BACKGROUND INFORMATION

It is often desirable to retain records of business transactions for analytical purposes such as data mining. Recent developments in business software systems and architecture have provided this functionality in an automated fashion. FIG. 1a shows a typical scenario. Customer 150 interacts with application 209 running on transaction system 110. From time to time application 209 may generate transaction data 115, which is to be saved to transaction system database 245. These "save" events provide a trigger for the extraction of data from application 209 on transaction system 110 to analytics system 105. As noted above, transaction data 115 is extracted to analytics system 105 for storage, processing or data-mining functions. Analytics system 105 includes database management system ("DBMS") 130 and server 125. DBMS 130 provides storage of received transaction data 115, search functionality, etc. Server 125 provides processing capabilities for analyzing and processing transaction data 115 stored in DBMS 130.

A particular example of a transaction and analytics system is the collaborative behavior of an OLTP ("Online Transaction Processing") system and an OLAP ("Online Analytical Processing") system. OLTP refers to a type of computer processing in which a computer system responds immediately to user requests as opposed to batch processing. Each request is considered to be a transaction. An OLAP refers to a category of software tools that provides analysis of data stored in a database. OLAP tools enable users to analyze different dimensions of multidimensional data such as time series and trend analysis views. An OLAP often is used in data mining. Typically an OLAP includes a server, which sits between a client and a database management system ("DBMS"). The OLAP server understands how data is organized in the database and has special functions for analyzing the data.

A significant technical challenge concerns the mechanism through which transaction data 115 is to be made available (i.e., transported) to analytics system 105. Intelligent design of an architecture that permits flexible and efficient extraction of data from transaction system 110 to analytics system 105 may have a significant performance impact upon the interaction between transaction system 110 and analytics system 105. In particular, it is desirable that the chosen architecture provide generic extraction of arbitrary data types without requiring reprogramming on a case by case basis. In addition, it is important that the architecture accommodate the particular data load generated by the transaction system.

SUMMARY OF THE INVENTION

The present invention provides a generic extraction framework for extraction of data generated on a transaction system to an analytics system. The generic extraction framework allows extraction services to be efficiently created for arbitrary data types with the need for reprogramming on a case by case basis. In addition, the generic extraction framework obviates the need for the transmission of data using a middleware layer, and therefore provides an environment for transmission of high data volumes between a transaction and analytics system.

According to one embodiment of the invention an application developer using an application modeling environment may select data (e.g., transaction data) to be extracted from a software application to be run on the transaction system to the analytics system. The modeled application and the selection information are compiled against extraction services provided by the framework in order to provide these extraction services to the running application. An application generator generates both runtime extraction modules and data structures that provide for the extraction of data from the transaction system to the analytics system.

According to one embodiment, a framework class is provided that handless all tasks related to the extraction process. In addition, the application generator generates an extraction data structure that is utilized to maintain the extraction data. In order to enable the extraction process to operate within a preexisting architecture that includes an analytics adapter, a data source definition record is made accessible to the analytics adapter. The data source definition record maintains all the required information necessary to enable the extraction process to occur including the data source, extraction structure, application component and appropriate extraction modules.

BRIEF DESCRIPTION OF THE DRAWINGS

FIG. 1c shows a general architecture for the operation of a channel for transport of data generated by an application to a queue.

DETAILED DESCRIPTION

Figure 1A:
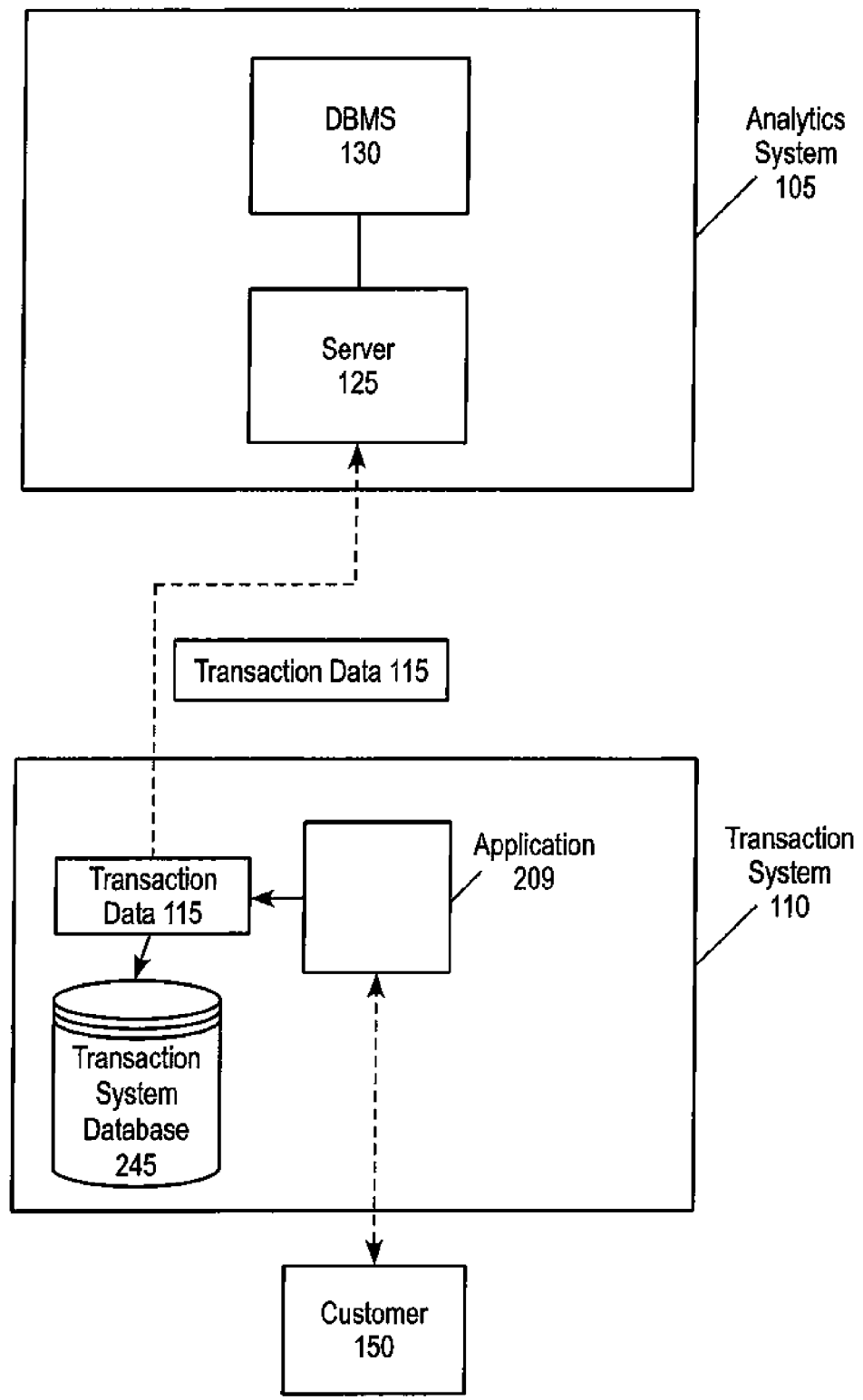
FIG. 1a shows a relationship between a transaction system and an analytics system.

The present invention provides a generic framework for performing extraction services from a transaction system 110 running any number of applications to an analytics system 105. The generic extraction framework provided by the present invention accommodates arbitrary data types without the need for reprogramming on a case by case basis. In addition, the generic extraction framework is able to handle significant data volumes as it provides data transport services from an application running on a transaction system to a queue (where it is stored for later uploading to an analytics system) without the use of a middleware layer.

The overall extraction process typically comprises a number of distinct phases or modes. FIG. 1b shows a full upload phase, a delta initialization phase, and a delta upload phase. Before describing the overall operation of each phase, the general mode of communication between analytics system 105 and transaction system 110 will be described. Transaction system 110 includes, among other things, processor 215b and transaction system database 245. Analytics system 105 includes, among other things, processor 215a and metadata tables 255. Metadata tables 255 store metadata regarding transaction data generated on transaction system 110. Processor 215a on analytics system 105 initiates RFC ("Remote Function Call") via analytics adapter module. Analytics adapter module 240 provides a communication bridge between analytics system 105 and transaction system 110. The nature of RFC 245 is determined by information packages (i.e., 235a, 235b, 235c).

Typically, each information package 235a, 235b, 235c is associated with a particular phase of the extraction process. For example, 181a depicts a full upload phase of an extraction process. During this phase based upon instructions in full upload information package 2345a, processor 215a on analytics system 105 executes RFC 245, which causes all data generated by application 209 to be extracted from transaction system 110 to analytics system 105. Extraction data is retrieved from transaction system database 245 and processed by selection module 225 and mapping module 227, and then transported to analytics system 105. The structure and function of selection and mapping modules 225 and 227 will become evident as the invention is further described. For now, it is sufficient to realize that selection module 225 and mapping module 227 perform some operations on transaction data stored in transaction database 245 so it is in a format suitable for analytics system 105. In addition, during full upload phase 181a, metadata tables 255 on analytics system 105 are populated with information regarding transaction data to be extracted. Note that queue 285 on transaction system 110 is not utilized during full upload phase 181a.

181b shows a delta initialization phase of an extraction process. During delta initialization phase 181b, processor 215 on analytics system 105 initiates RFC call 245 that establishes channel 229 on transaction system 110. Channel 229 will allow transport of transaction data 115 from application 209 to queue 285. The structure and nature of channel 229 will become evident as the invention is further described. In addition, during delta initialization phase 181b, metadata tables 255 are populated.

Once delta initialization 181b has occurred, application 209 may generate transaction data, which is then automatically transported to queue 285 via channel 229 for later upload to analytics system 105. Typically, transaction data stored in queue 285 represents changes (i.e., delta information) of the data that was already uploaded during full upload phase 181a.

During delta upload phase 181c, processor 215 executes RFC 245, which causes delta transaction data stored in queue 285 to be uploaded to analytics system 105.

As noted above, during delta initialization phase 181b, channel 229 is established for transport of delta transaction data to queue 285. A significant performance issue concerns the efficiency and structure of channel 229.

Figure 1B:
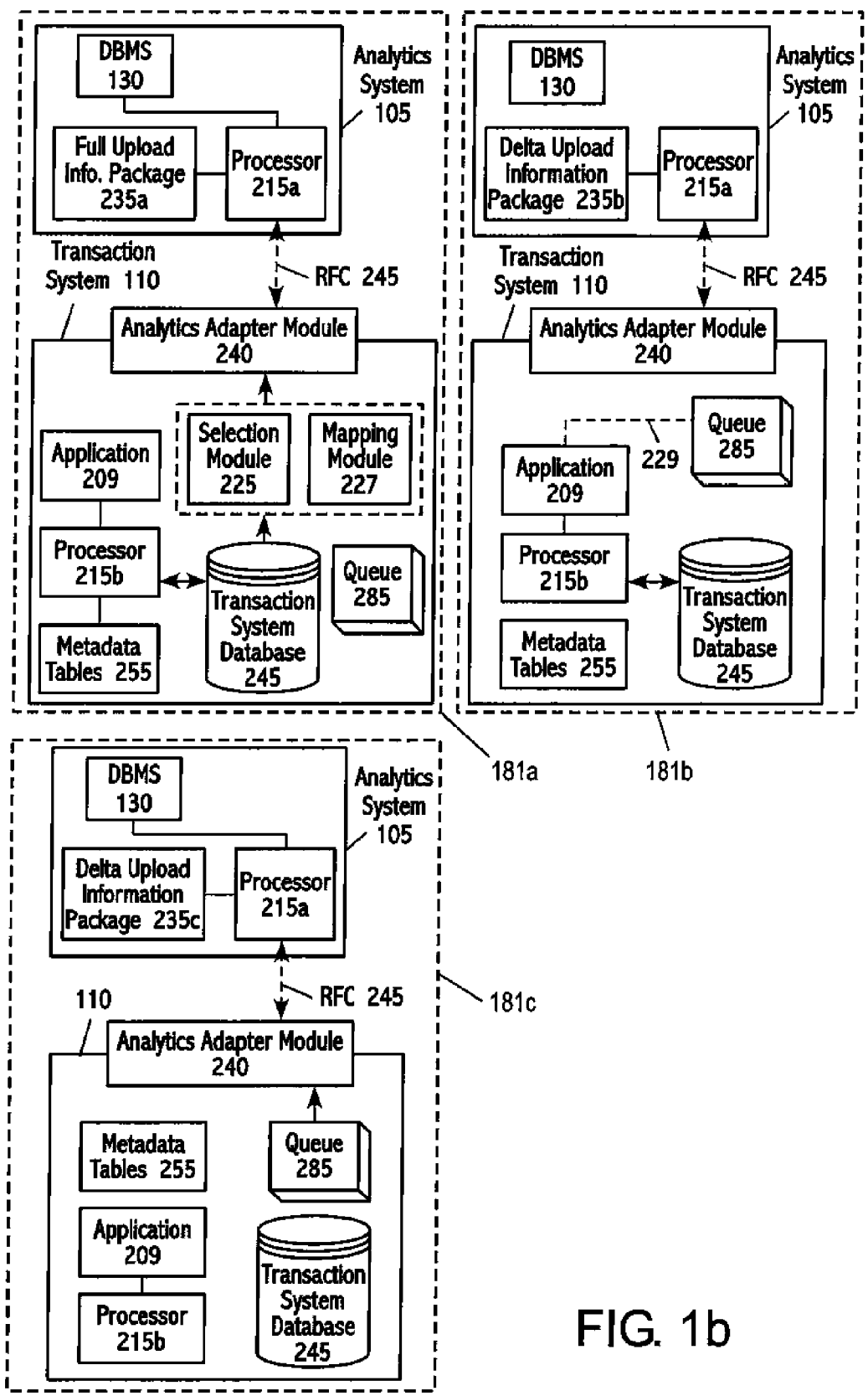
FIG. 1b shows a full upload phase, a delta initialization phase, and a delta upload phase.

FIG. 1c shows a general architecture for the operation of a channel 229 for transport of data generated by an application 209 to a queue 285. Application 209 running on transaction system 110 generates transaction data 115. Transaction data 115 may be stored in transaction database 245, which typically is a relational database. In this case, transaction data 115 is mapped to tables (not shown) forming the structure of transaction system database 245. Service API 227 provides infrastructure and services to effectuate the extraction of transaction data from transaction system (i.e., data generated by application 209) to analytics system 105. Event handler 298 receives "save events" as transaction data 115 is written to transaction system database 245. Upon receiving these "save events", event handler 298 calls various services provided by service API 227. The services provided by service API 227 cause the transmission of transaction data 115 so that it is available to analytics system 105 in a format compatible with analytics system 105.

A significant technical issue concerns the nature of channel 229 for transmission of transaction data 115 from application 209 to queue 285. A related technical issue concerns how transaction data 115 is to be prepared for insertion into queue 285 in a form that is appropriate for analytics system 105. These design choices may have a significant performance impact upon the extraction process.

Figure 2A:
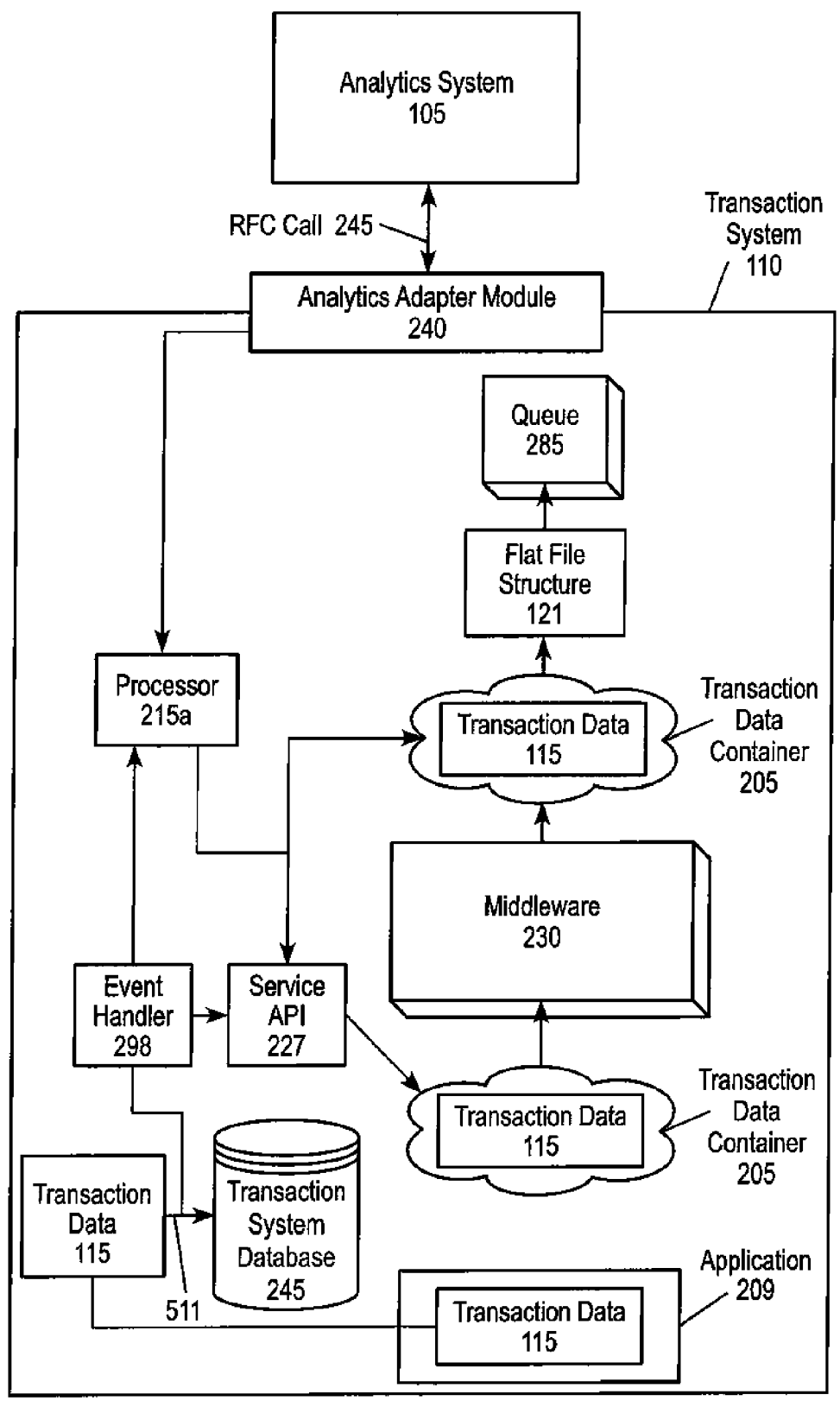
FIG. 2a shows an architecture for extracting transaction data from an application running on transaction system to a queue.

For example, FIG. 2a shows an architecture for extracting transaction data from transaction system application 209 running on transaction system 110 to queue 285 where it will ultimately be available for uploading to analytics system 105. As shown in FIG. 2a, the process relies upon middleware 230 and transaction data container 205 for transmission of transaction data 115 to queue 285.

The architecture shown in FIG. 2a assumes that a delta initialization phase 181b has been completed and a channel 229 established. Application 209 generates transaction data 115, which is to be stored in transaction database 245. Event handler 298 detects save events 511 when transaction data 115 is written to transaction system database 245. Upon detection of save events, event handler 298 notifies processor 215a, which intercepts transaction data 115 and initiates certain calls to service API 227, which cause transaction data 115 to be encapsulated in transaction data container 205. The exact structure of transaction data container is not important. However, it should be understood that with the architecture shown in FIG. 2a, transaction data container 205 stores transaction data 115 in a complex format that has been abstracted from the underlying tables of transaction system database 245. This complex data format must ultimately be processed to generate a data format compatible with analytics system 105.

Transaction data container 205 is transmitted from application 209 through middleware 230. Service API 227 provides functions for transforming transaction data 115 stored in transaction data container 205 into flat file structure 121, which is compatible with analytics system 105. Transaction data 115 that has been converted to flat file structure 121 is stored in queue 285 for retrieval by analytics system 105 via RFC call 245. Among other functions, analytics adapter module 240 prepares data transaction data 115 for processing by transaction system 105. Analytics system 105 makes RFC call 245 to analytics adapter module 240 to perform upload of data in queue 285. Among other functions, analytics adapter module 240 performs functions for upload of data to analytics system 105.

Figure 2B:
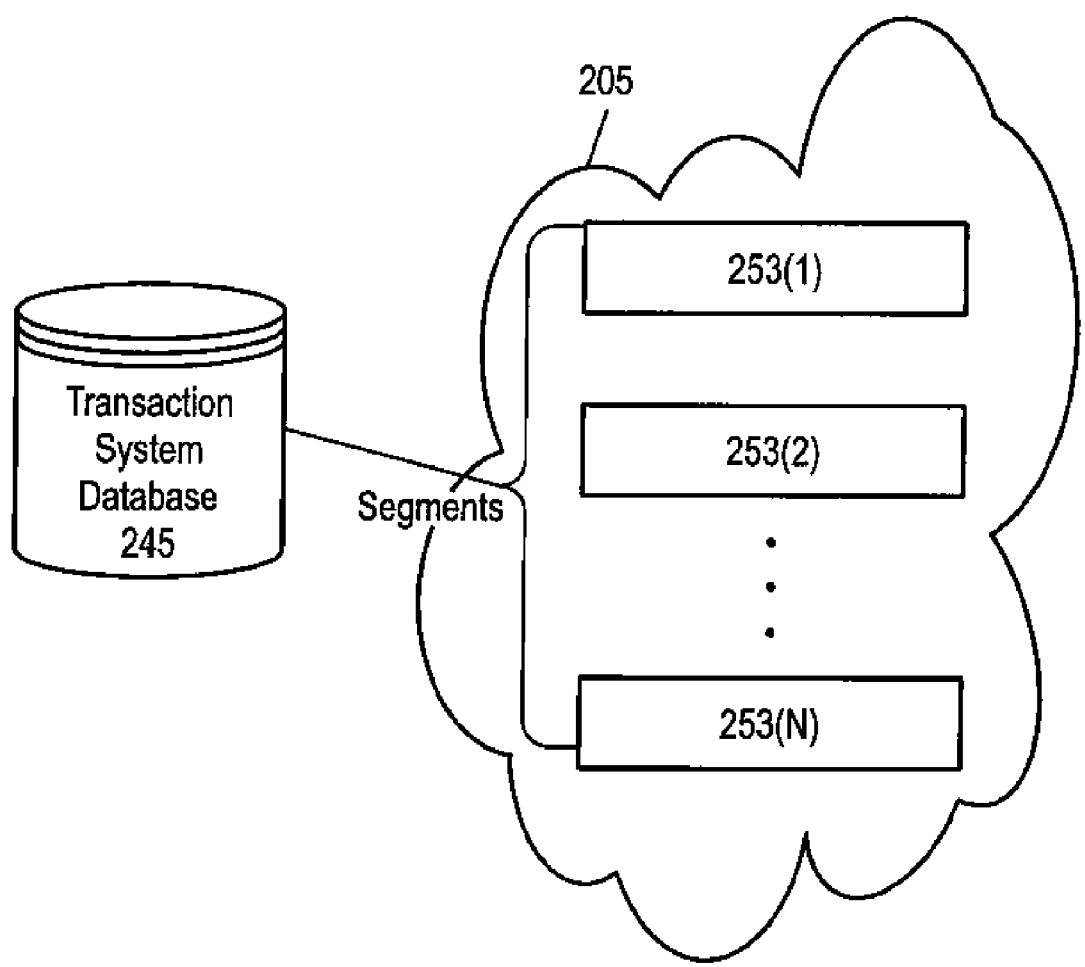
FIG. 2b illustrates the relationship between a transaction data container and a transaction database.

The architecture shown in FIG. 2 has a number of limitations. First, the architecture does not accommodate generic transaction data 115. Because transaction data container 205 abstracts the underlying fields and tables of transaction system database 245, transaction data container 205 must be interpreted. FIG. 2b illustrates the relationship between transaction data container 205 and transaction database 245. Transaction data container includes a number of segments 253(1)-253(N), which are mapped to tables 247 forming transaction database 245. Segments 253(1)-253(N) may span multiple tables in transaction database 245. In addition, the structure of transaction data container 205 typically will vary depending upon the nature of application 209. Because of the varying format of transaction data container 205 and its relationship to application 209 and transaction system database 245, algorithms for converting segments stored in transaction data container 205 must be re-written for different applications types of transaction data containers 205.

Furthermore, in a many scenarios, transaction system 110 may generate a significant amount of data. For example, in a resales order transaction system, high volumes of data are typically generated. Using the scenario shown in FIG. 2, the large volume of generated data containers 205 place significant bandwidth and resource demands on middleware 230. Thus, the extraction scheme shown in FIG. 2 is not appropriate for applications involving voluminous data generation. Another limitation with the scheme shown in FIG. 2a is that there may exist particular application frameworks that do not utilize a data container 205.

Figure 3:
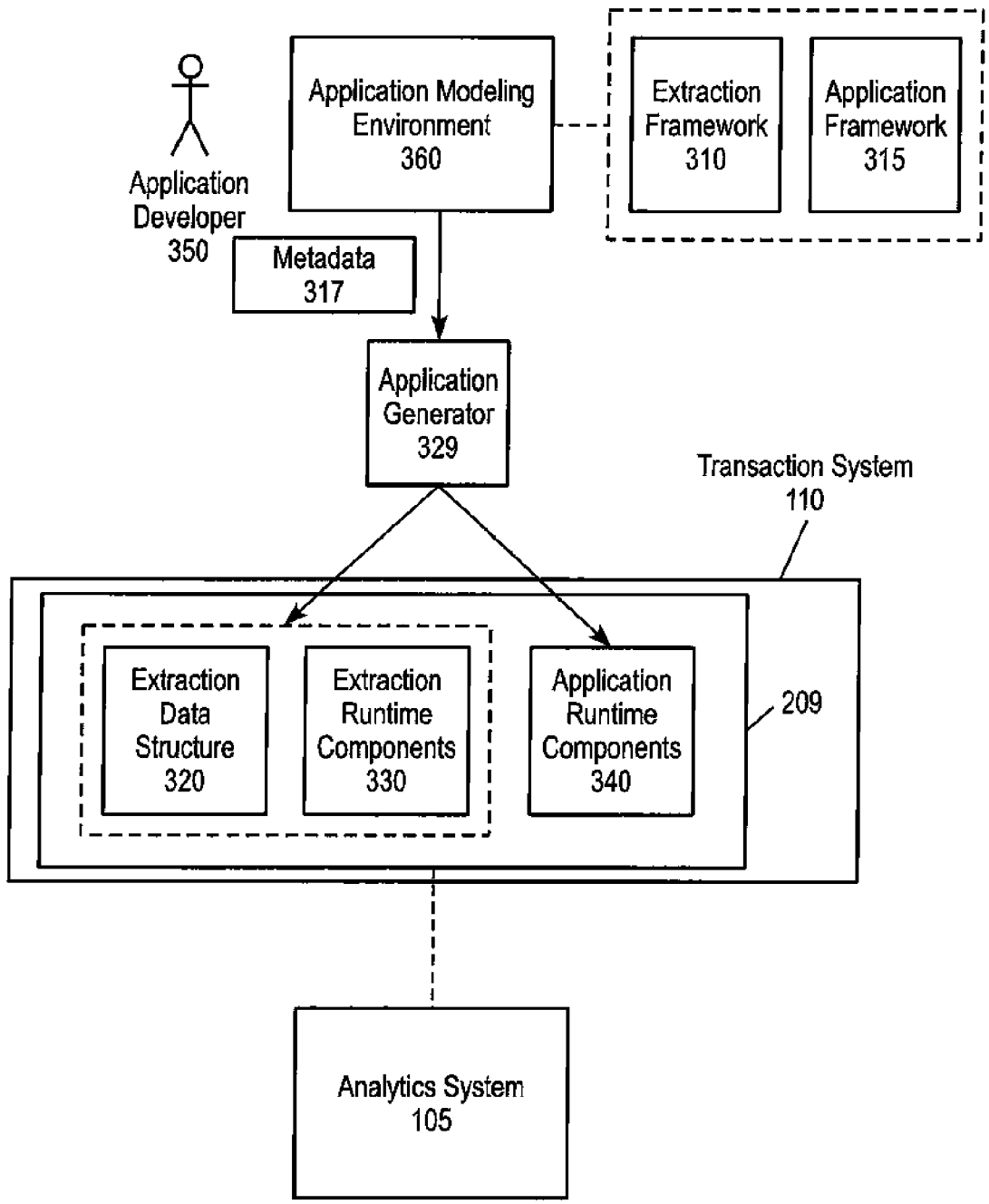
FIG. 3 depicts a relationship between an application, an application framework and an extraction framework according to one embodiment of the present invention.

FIG. 3 depicts a relationship between an application, an application framework and an extraction framework according to one embodiment of the present invention. Application framework 315 defines a common architecture for developing applications 209 by providing services and functionalities that may be invoked by application 209. Using application modeling environment 360, application developer 350 models application 209 against the constructs and services provided by application framework 315. Application 209 may invoke the services provided by application framework 315.

Extraction framework 310 provides services and functionality for performing extraction of data from transaction system 110 to analytics system 105. According to one embodiment of the present invention, application developer 350 may model application 209 to invoke extraction services provided by extraction framework 310.

Application modeling environment 360 generates metadata 317, which is processed by application generator 329. Metadata 317 includes information representing the modeling choices made by application developer 350. In particular, among other things, metadata 317 reflects the services to be invoked from application framework 315 and extraction framework 310. Application generator 329 receives metadata 317 and generates application 209. In particular, according to one embodiment, application generator 329 generates extraction data structure 320, extraction runtime components 330 and application runtime components 340.

Application runtime components 340 represent runtime files for executing application 209, and in particular those services associated with application framework 315. Application runtime components 340 may include runtime executable files, resources, etc. (e.g., DLL files, EXE files, Java Byte Code, etc.). Similarly, extraction runtime components 330 may include runtime files for executing extraction services provided by extraction framework 310. Extraction runtime components 330 include runtime executable files, resources, etc. (e.g., DLL files, EXE files, Java Byte Code).

As shown in FIG. 3, application generator also generates extraction data structure 320, which is used by extraction runtime components 330 to facilitate an extraction process. The nature of extraction runtime components 330 and extraction data structure 320 will become evident as the invention is further described.

Figure 4:
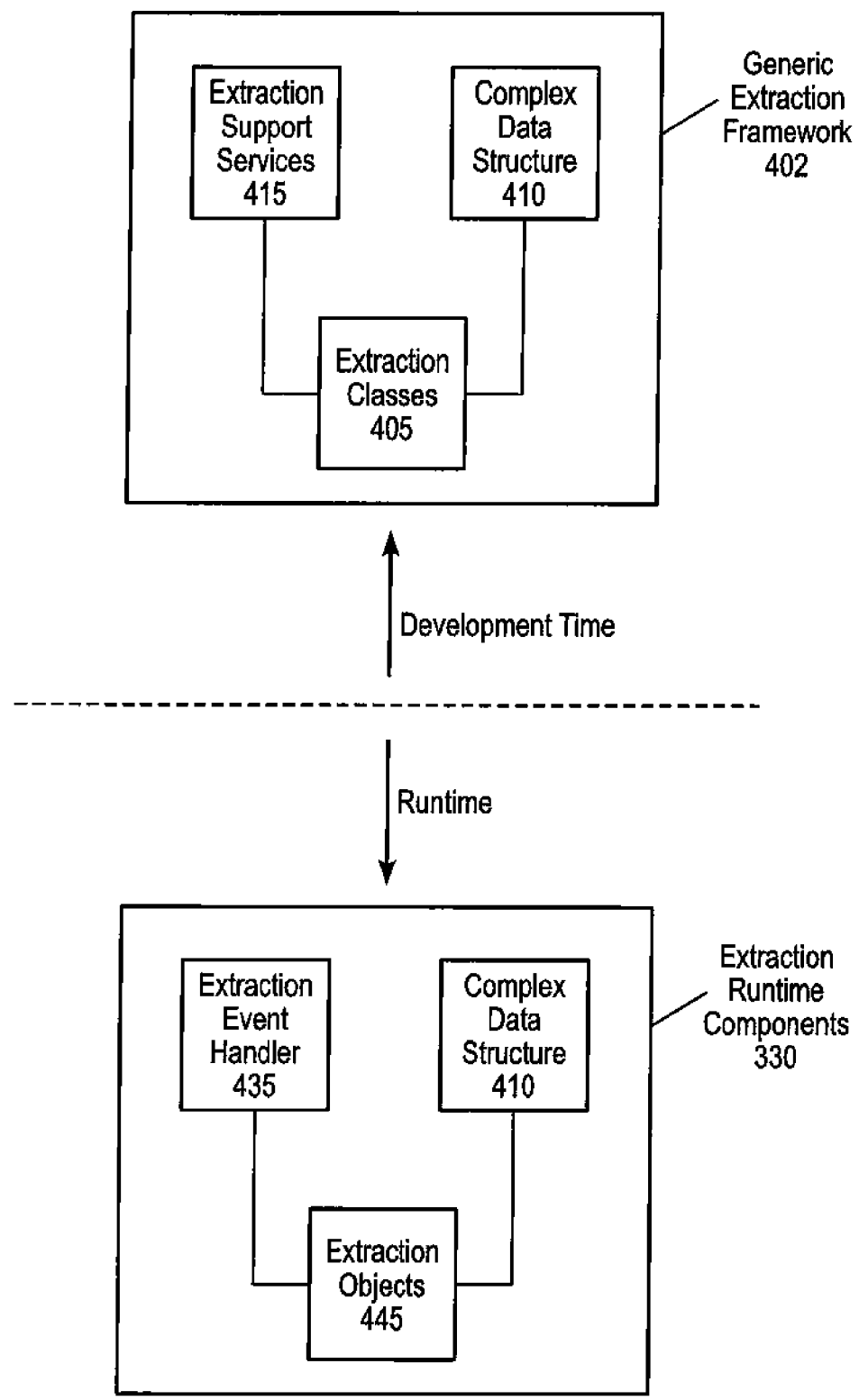
FIG. 4 depicts a generic extraction framework according to one embodiment of the present invention.

FIG. 4 depicts a generic extraction framework according to one embodiment of the present invention. Generic extraction framework 402 allows for transport of arbitrary data types from application 209 running on transaction system 110 to queue 285, where it is made available to analytics system 105 for later uploading. Generic extraction framework 402 includes extraction support services 415, extraction classes 405 and complex data structure 410. Extraction support services 415 provides various services such as event handling and other low level services for performing generic extraction of transaction data 115 from transaction system 110 to analytics system 105. Extraction classes 405 provide various methods and data structures for providing generic extraction of data from application 209 running on transaction system 110 to analytics system 105. Complex data structure 410 provides a data structure for storing extraction data in an intermediate stage before transaction data 115 is placed in queue 285. As will become evident as the invention is further described because complex data structure 410 assumes a structure compatible with transaction data container 205, it allows for the transfer of transaction data 115 to queue 285 using preexisting services of service API 227. The structure and function of extraction classes 405 and complex data structure will become evident as the invention is further described.

FIG. 4 also shows corresponding extraction runtime components 330 including extraction event handler 435, extraction objects 445 and complex data structure 410. Extraction event handler 435 provides event handling services specifically designed for performing generic extraction functions from application 209 running on transaction system 209 to analytics system 105. Extraction objects 445 represent instantiated extraction classes 405 existing at runtime.

According to one embodiment of the present invention, extraction event handler 435 detects events occurring with respect to application 209. Upon detection of particular events, extraction event handler 435 causes particular actions to occur. The function of extraction event handler 435 will become evident as the invention is further described. According to one embodiment of the present invention, event handler 435 detects save events whereby transaction data 115 is written to transaction system database 245.

The generic extraction framework according to the present invention may be stored as a set of instructions that is accessible and executable by a processor. This set of instructions may stored in a storage subsystem that may include a compact disk, hard drive, DVD-ROM, CD-ROM or any type of computer- or machine-readable storing medium.

Figure 5A:
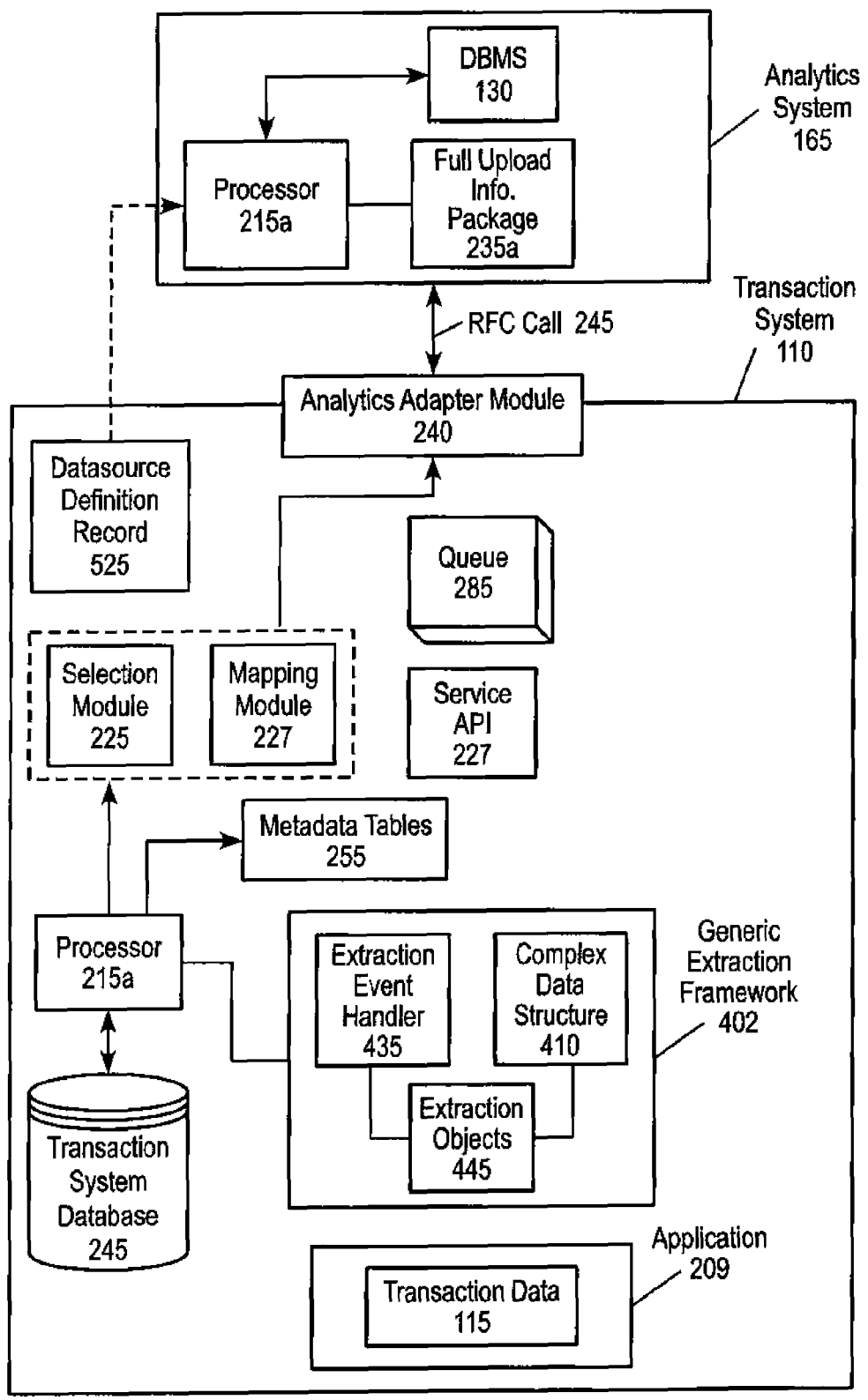
FIG. 5a depicts a full upload phase of an extraction process according to one embodiment of the present invention.

FIGS. 5a-5a describe a full upload phase, a delta initialization phase and a delta upload phase of an extraction process according to one embodiment of the present invention.

FIG. 5a depicts a full upload phase of an extraction process according to one embodiment of the present invention. Datasource definition record 525 is provided to analytics system 165. Among other things, datasource definition record 525 provides analytics system 105 with information regarding selection 225 and mapping 227 modules that are to be executed on transaction system. The structure and function of datasource definition record 525, selection 225 and mapping 227 modules will be described below. For now it is sufficient to realize that datasource definition record 525 provides analytics system 105 with certain information regarding the invocation of an extraction processes on transaction system 110. During the full upload phase, analytics system 165 executes RFC 245 to transaction system 110 via analytics adapter module 240. RFC call 245 is established via full upload information package 225*a*.

RFC call 245 causes transaction data stored in transaction system database 245 to be extracted from transaction system database 245 and processed by selection 225 and mapping 227 modules. Selection module 225 determines the data stored in transaction system database 245 that is to be extracted from transaction system database 245. As noted above, the selection of data to be extracted from transaction system 110 to analytics system 105 is established during application modeling (i.e., see FIG. 3). An exemplary user interface for selection of data to be extracted will be described below. Mapping module 227 performs transformation on data stored in transaction system database 245 into a form that is compatible with analytics system 165. Exemplary selection and mapping processes are described in detail below.

Once transaction data stored in transaction system database 245 is processed by selection module 225 and mapping module 227, it is passed to analytics adapter 240 where it is uploaded to analytics system 165 and stored in DMBS 130. In addition, during the full upload process, metadata tables 255 on analytics system 105 are populated with information regarding the transaction data 115 that is to be extracted to analytics system 105.

Figure 5B:
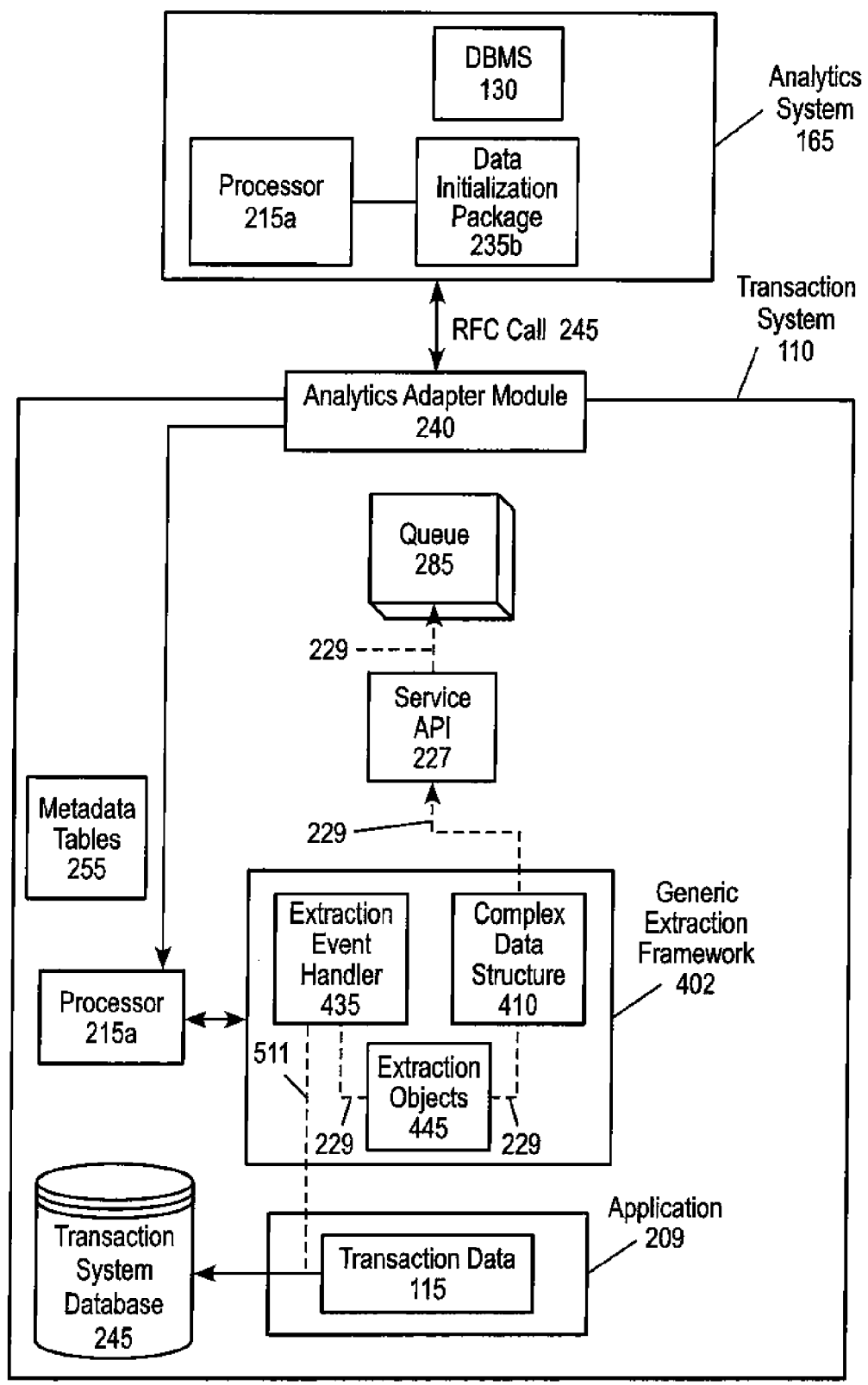
FIG. 5b depicts a delta initialization phase of an extraction process according to one embodiment of the present invention.

FIG. 5*b* depicts a delta initialization phase of an extraction process according to one embodiment of the present invention. Analytics system 105 executes RFC call 245 via analytics adapter module. RFC call 245 causes processor 215*a* to establish channel 229 through which extraction data 115 may flow from application 209 to queue 285. Once channel 229 has been established, a path exists for the flow of transaction data 115 generated by application 209 to queue 285. In particular, as shown in FIG. 2*b*, when application 209 is running, save event 511 is detected by extraction event handler 445 (i.e., transaction data 115 is saved to transaction system database 245). Extraction event handler 445 makes appropriate method calls to extraction objects 445 to cause population of complex data structure 410. Complex data structure 410 is then provided via established channel 229 to queue 285 via a call to a queue loading service provided by service API 227.

Figure 5C:
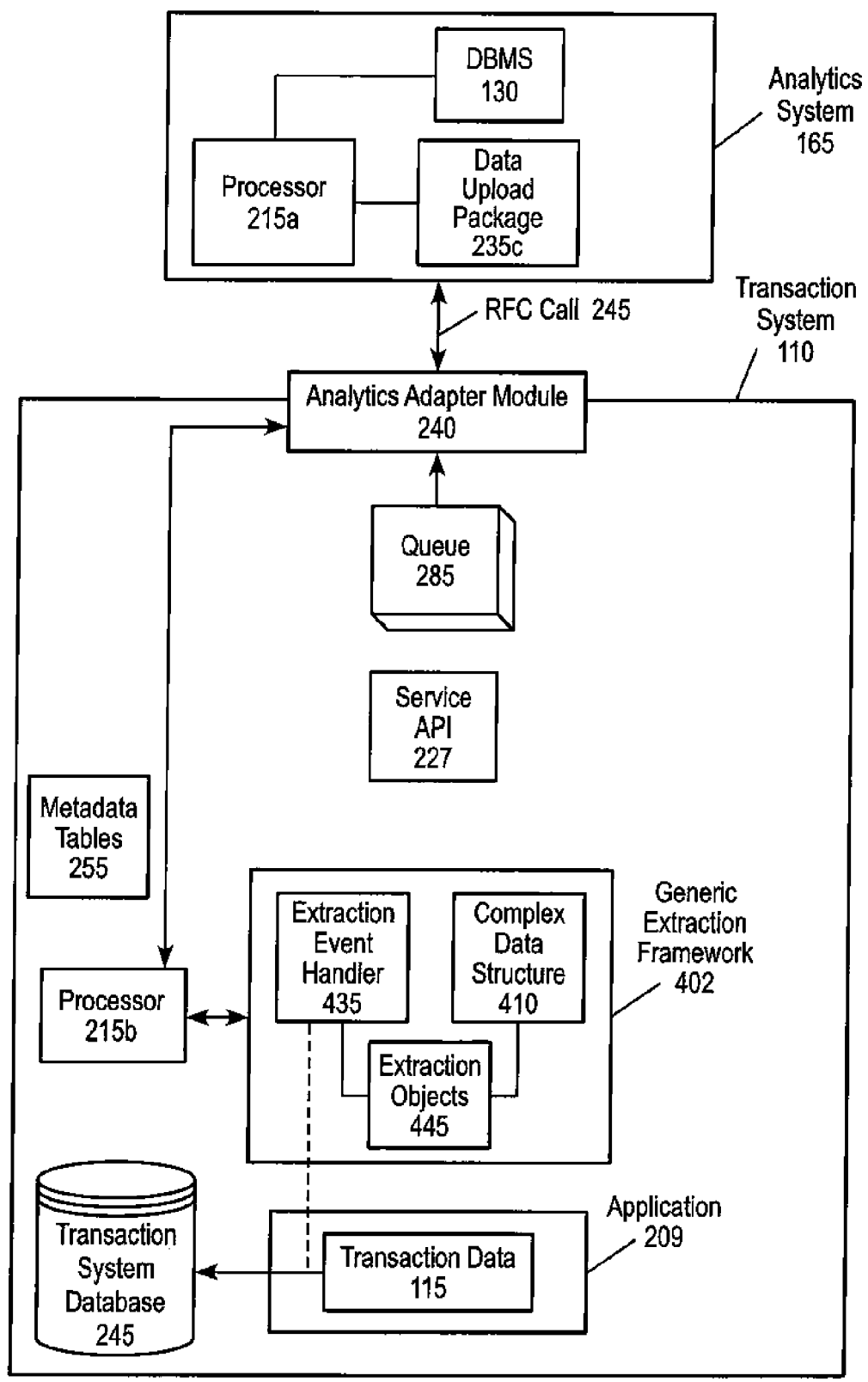
FIG. 5c depicts a delta upload phase of an extraction process according to one embodiment of the present invention.

FIG. 5*c* depicts a delta upload phase of an extraction process according to one embodiment of the present invention. As shown in FIG. 5*c*, transaction data representing delta information that was previously stored in queue 285 during running of application 209 is uploaded to analytics system. In particular, as shown in FIG. 5*c*, processor 215*a* on analytics system utilizes delta upload information package 235*c* to make RFC call 245 to transaction system 110 via analytics adapter module 240. Processor 215*b* then makes call to analytics adapter module 240 to cause delta transaction data stored in queue 285 to analytics system 105. Data received at analytic system 105 is stored in DBMS 130 where it is available for further processing, analytics, refinement, etc.

According to one embodiment a generic extractor classes 405 handle all tasks related to the extraction process. According to one embodiment, an extraction class 405 CL_CMS_LO_BW_APPL_EXTRACT has the following methods:

CMS_LO_BW_GET_TIME_INTERVAL

This method provides information regarding when was the last time the analytics system was updated with data using the datasource.

CMS_LO_BW_UPDATE_TIME_INTERVAL

This method updates the information about the time when the update using the datasource is performed.

CMS_LO_BW_EXTRACT

The method performs the actual fetch of the data on the basis of the selection options in form of data packets. This method does not use the time stamp approach to handle the delta update requirements. It works on the premise that the delta queues would be directly updated with changed data after the initial upload.

CMS_LO_BW_EXTRACT_DELTA

The method performs the actual fetch of the data on the basis of the selection options in form of data packets. This method uses the time stamp approach to handle the delta update requirements. It works on the premise that the delta queues would be updated with changed data after the initial upload using the timestamps of the previous upload being maintained in the timestamps table.

CMS_LO_BW_MAPPER

This method is used to map the complex data into a flat structure so that it can be moved across to analytics system 105.

LOG_WRITE

This method is used to log exceptions to a log.

According to one embodiment, the CMS_LO_BW_EXTRACT method has the following signature:

| | | |
|---|---|---|
| VALUE( I_PACKSIZE ) | TYPE I | |
| VALUE( I_FIRST_CALL ) | TYPE RSAAPI_IF-INITFLAG | |
| VALUE( APPL_NAME ) | TYPE CMST_APPLICATION | Lean order application code |
| I_GT_WHERE | TYPE TABLE OPTIONAL | |
| I_T_SEGMENTS | TYPE TABLE OPTIONAL | |
| I_T_FIELDS | TYPE TABLE OPTIONAL | |
| I_T_SMOSEL | TYPE TABLE | |
| I_UPDMODE | TYPE SBIWA_S_INTERFACE-UPDMODE OPTIONAL | |
| I_REQUNR | TYPE SBIWA_S_INTERFACE-REQUNR OPTIONAL | |
| E_DATA | TYPE ANY | |
| E_T_RETURN | TYPE TABLE OPTIONAL | |
| NO_MORE_DATA | | There is no more data available to transfer. |
| ERROR_PASSED_TO_MESS_HANDLER | | Error has been passed on to the appropriate message handler. |

According to one embodiment, the CMS_LO_BW_MAPPER method has the following signature:

| | | |
|---|---|---|
| EXTRACT DATA | TYPE ANY | Mapped data |
| I_DATA | TYPE ANY | Extracted data |
| APPL_NAME | TYPE CMST_APPLICATION | Lean order application code |
| MAP_ERROR | | Mapping error |

According to one embodiment of the present invention, selection module 225 is implemented as follows.

Selection Module Template

```
*"-------------------------------------------------------------------
*"*"Local interface:
*"  IMPORTING
*"     REFERENCE(I_PACKSIZE) TYPE I
*"     REFERENCE(I_FIRST_CALL) TYPE RSAAPI_IF-INITFLAG
*"  EXPORTING
*"     REFERENCE(E_DATA)
*"  TABLES
*"     I_GT_WHERE OPTIONAL
*"     I_T_SEGMENTS STRUCTURE   SMOXSEGMS OPTIONAL
*"     I_T_FIELDS STRUCTURE     SMOXFIELDS OPTIONAL
*"     I_T_SMOSEL STRUCTURE     SMOBWASEL OPTIONAL
*"     E_T_RETURN STRUCTURE     BAPIRET2 OPTIONAL
*"  EXCEPTIONS
*"     NO_MORE_DATA
*"     OPEN_CURSOR_ERROR
*"     CURSOR_ALREADY_EXISTS
*"     CURSOR_DOES_NOT_EXIST
*"-------------------------------------------------------------------
*+<BEGIN>
*+COM FUNCTION <FUNCNAME>.
*+COM*"-------------------------------------------------------------------
-
*+COM*"*"Local interface:
*+COM*"  IMPORTING
*+COM*"     REFERENCE(I_PACKSIZE) TYPE I
*+COM*"     REFERENCE(I_FIRST_CALL) TYPE RSAAPI_IF-INITFLAG
*+COM*"  EXPORTING
*+COM*"     REFERENCE(E_DATA) TYPE <BW_STR_C>
*+COM*"  TABLES
*+COM*"     I_GT_WHERE OPTIONAL
*+COM*"     I_T_SEGMENTS STRUCTURE   SMOXSEGMS OPTIONAL
*+COM*"     I_T_FIELDS STRUCTURE     SMOXFIELDS OPTIONAL
*+COM*"     I_T_SMOSEL STRUCTURE     SMOBWASEL OPTIONAL
*+COM*"     E_T_RETURN STRUCTURE     BAPIRET2 OPTIONAL
*+COM*"  EXCEPTIONS
*+COM*"     NO_MORE_DATA
*+COM*"     OPEN_CURSOR_ERROR
*+COM*"     CURSOR_ALREADY_EXISTS
*+COM*"     CURSOR_DOES_NOT_EXIST
*+COM*"-------------------------------------------------------------------
-
*+COM
*+COM    TYPE-POOLS:
*+COM            RSAOT,
*+COM            RSDS,
*+COM            SBIWA.
*+COM
*+COM    CONSTANTS:
*+COM            lc_requnr       TYPE sbiwa_s_interface-requnr
*+COM                            VALUE space,
*+COM            lc_appl_name    TYPE cmst_application VALUE '<APPL>',
*+COM            lc_logsys       TYPE TBDLS-LOGSYS VALUE space,
*+COM            lc_updmode      TYPE SBIWA_S_INTERFACE-UPDMODE VALUE 'F'.
*+COM
*+COM    DATA:
*+COM            lv_initflag     TYPE       sbiwa_s_interface-initflag,
*+COM            lv_maxsize      TYPE       sbiwa_s_interface-maxsize.
*+COM
*+COM    STATICS:
*+COM            ls_select       TYPE LINE OF   sbiwa_t_select,
*+COM            lt_select       TYPE           sbiwa_t_select.
```

```
*+COM
*+COM
*+COM      DATA:
*+COM            lv_myclass TYPE REF TO cl_cms_lo_bw_appl_extract.
*+COM
*+COM      STATICS: lv_per_myclass TYPE REF TO cl_cms_lo_bw_appl_extract.
*+COM
*+COM      IF lv_per_myclass IS INITIAL.
*+COM         CREATE OBJECT lv_myclass.
*+COM         lv_per_myclass = lv_myclass.
*+COM      ENDIF.
*+COM
*+COM*----- Parameter passing ----------------------------------------*
*+COM      lv_initflag = i_first_call.
*+COM      lv_maxsize = i_packsize.
*+COM
*+COM         IF lv_initflag < > space.
*+COM         LOOP AT i_t_smosel.
*+COM             MOVE-CORRESPONDING i_t_smosel TO ls_select.
*+COM             APPEND ls_select TO lt_select.
*+COM         ENDLOOP.
*+COM      ENDIF.
*+COM
*+COM*----- Call to generic extractor -------------------------------------
-----*
*+COM
*+COM      CALL METHOD lv_per_myclass->cms_lo_bw_extract
*+COM         EXPORTING
*+COM            i_packsize                     = i_packsize
*+COM            i_first_call                   = lv_initflag
*+COM            appl_name                      = lc_appl_name
*+COM            i_t_smosel                     = lt_select
*+COM            I_UPDMODE                      = lc_updmode
*+COM            I_REQUNR                       = lc_requnr
*+COM         IMPORTING
*+COM            E_DATA                         = e_data
*+COM         EXCEPTIONS
*+COM            NO_MORE_DATA                   = 1
*+COM            ERROR_PASSED_TO_MESS_HANDLER   = 2
*+COM            others                         = 3.
*+COM
*+COM      IF sy-subrc = 1.
*+COM         RAISE NO_MORE_DATA.
*+COM         EXIT.
*+COM      ELSEIF sy-subrc = 2.
*+COM         RAISE OPEN_CURSOR_ERROR.
*+COM      EXIT.
*+COM      ELSEIF sy-subrc > 2.
*+COM         MESSAGE e001 (CMS_BW_MSG).
*+COM         EXIT.
*+COM      ENDIF.
*+COM
*+COM
*+COM      ENDFUNCTION.
*+<END>
```

The following is pseudo-code for selection module 225 according to one embodiment of the present invention:
1. Create the instance of the generic extractor class cl_cms_lo_bw_appl_extract.
2. If lv_initflag is not initial.
   Loop at the input selection options.
   Append the input selection options to the selection options table. Endif.
3. Use the generic extractor instance to call the extraction method.

According to one embodiment of the present invention, mapping module 227 is implemented as follows.

Mapping Module Template

```
*"----------------------------------------------------------------------
*"*"Local interface:
*"  IMPORTING
*"     REFERENCE(I_DATA)
*"  TABLES
*"     EXTRACT_DATA
*"  EXCEPTIONS
```

```
*"        MAP_ERROR
*"        ENTRY_NOT_FOUND
*"----------------------------------------------------------------
*+<BEGIN>
*+COM FUNCTION <FUNCNAME>.
*+COM*"----------------------------------------------------------------
-
*+COM*"*"Local interface:
*+COM*"  IMPORTING
*+COM*"        VALUE(I_DATA) TYPE <BW_STR_C>
*+COM*"  TABLES
*+COM*"        EXTRACT_DATA STRUCTURE CMST_RTCM_BW
*+COM*"  EXCEPTIONS
*+COM*"        MAP_ERROR
*+COM*"        ENTRY_NOT_FOUND
*+COM*"----------------------------------------------------------------
-
*+COM
*+COM  DATA: lv_myclass            TYPE REF TO cl_cms_lo_bw_appl_extract.
*+COM
*+COM  STATICS: lv_per_myclass     TYPE REF TO cl_cms_lo_bw_appl_extract.
*+COM
*+COM  DATA: lc_appl_name          TYPE cmst_application VALUE '<APPL>'.
*+COM
*+COM  IF lv_per_myclass IS INITIAL.
*+COM     CREATE OBJECT lv_myclass.
*+COM     lv_per_myclass = lv_myclass.
*+COM  ENDIF.
*+COM
*+COM  CALL METHOD lv_per_myclass ->cms_lo_bw_mapper
*+COM     EXPORTING
*+COM          i_data             = i_data
*+COM          appl_name          = lc_appl_name
*+COM     IMPORTING
*+COM          extract_data       = extract data[ ]
*+COM     EXCEPTIONS
*+COM          map_error   = 1
*+COM          OTHERS      = 2.
*+COM  IF sy-subrc < > 0.
*+COM     RAISE map_error.
*+COM  ENDIF.
*+COM
*+COM ENDFUNCTION.
*+<END>
```

The following is pseudo-code for selection module 225 according to one embodiment of the present invention:
1. If no class instance exists.
   a. Create class cl_cms_lo_bw_appl_extract instance. Endif.
2. Call the mapper method using the class instance.

According to one embodiment, application generator 515 utilizes the following interface, which interprets the selection module template and mapping module template shown above.

```
*"----------------------------------------------------------------
*"*"Local interface:
*"  IMPORTING
*"     REFERENCE(IV_APPLICATION) TYPE CMST_APPLICATION
*"  EXCEPTIONS
*"     BW_STR_NOT_FOUND
*"     ERROR
*"----------------------------------------------------------------
```

Figure 6:
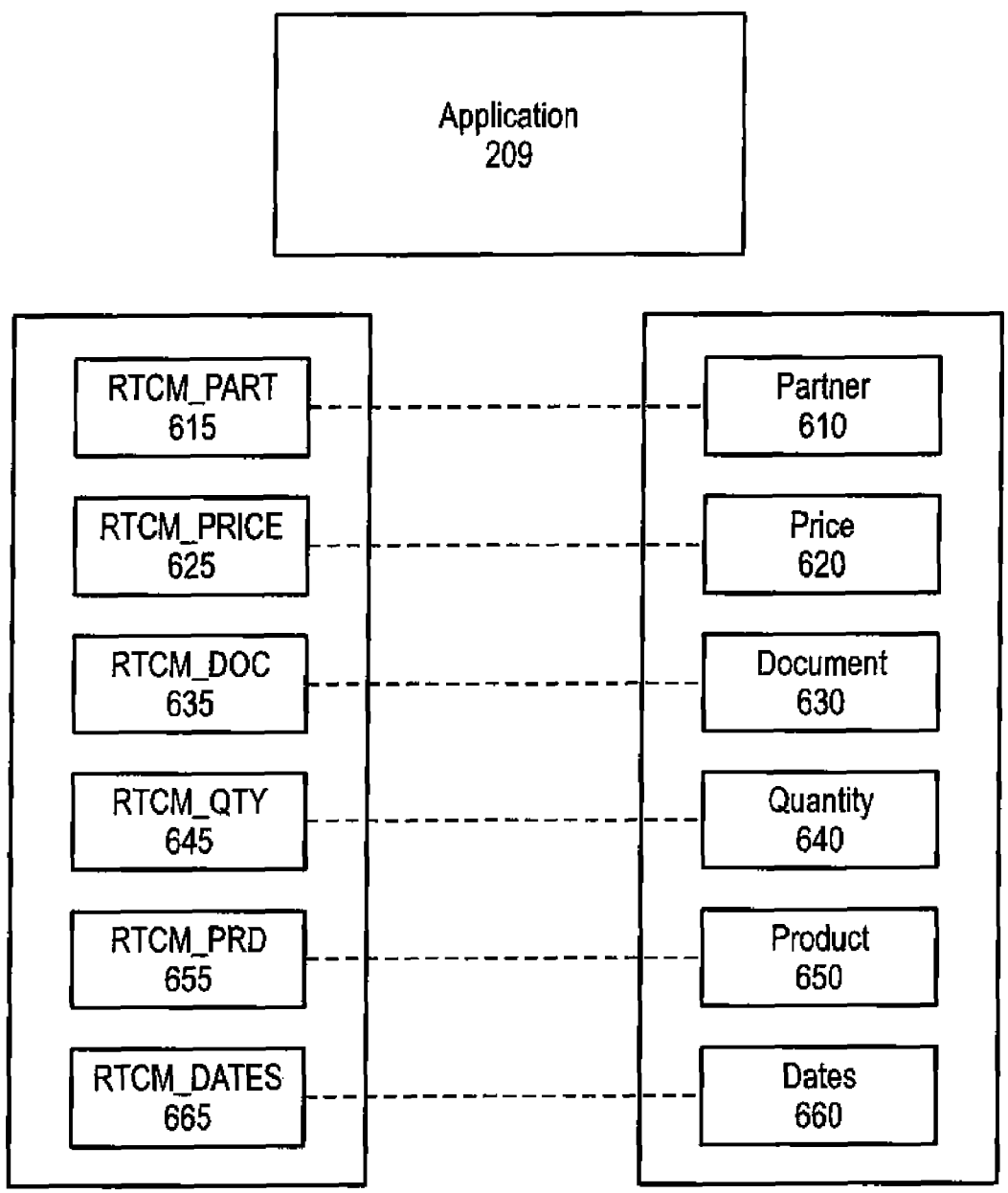
FIG. 6 depicts a data format utilized in a resales order and tracking management ("RTCM") system according to one embodiment of the present invention.

FIG. 6 depicts a data format utilized in a resales order and tracking management ("RTCM") system according to one embodiment of the present invention. The framework shown in FIG. 6 represents one example in which the present invention may be applied. It will be understood by skilled practitioners that the present invention may be utilized to provide a framework for data extraction from an application to an analytics system wherein the application utilizes any type of framework architecture. With respect to the exemplary application (a resales order system), datasets include partner 610, price 620, document 630, quantity 640, product 650 and dates 660. A qualifier represents different instances of a particular data set. For example, all partners relevant for a business process implemented using the resales order ("RO") are the partner qualifiers. The qualifiers are typically independent of the applications comprising a business process. To model an application, the relevant qualifiers are grouped as profiles, which are attached to an application. Thus, for an application such as RTCM of the Channel Sales business scenario there could exist six profiles 615, 625, 635, 645, 655 and 665 mapping respectively to a particular data set 615, 625, 635, 645, 655 and 665. Each of these profiles has a set of qualifiers attached to them.

Figure 7:
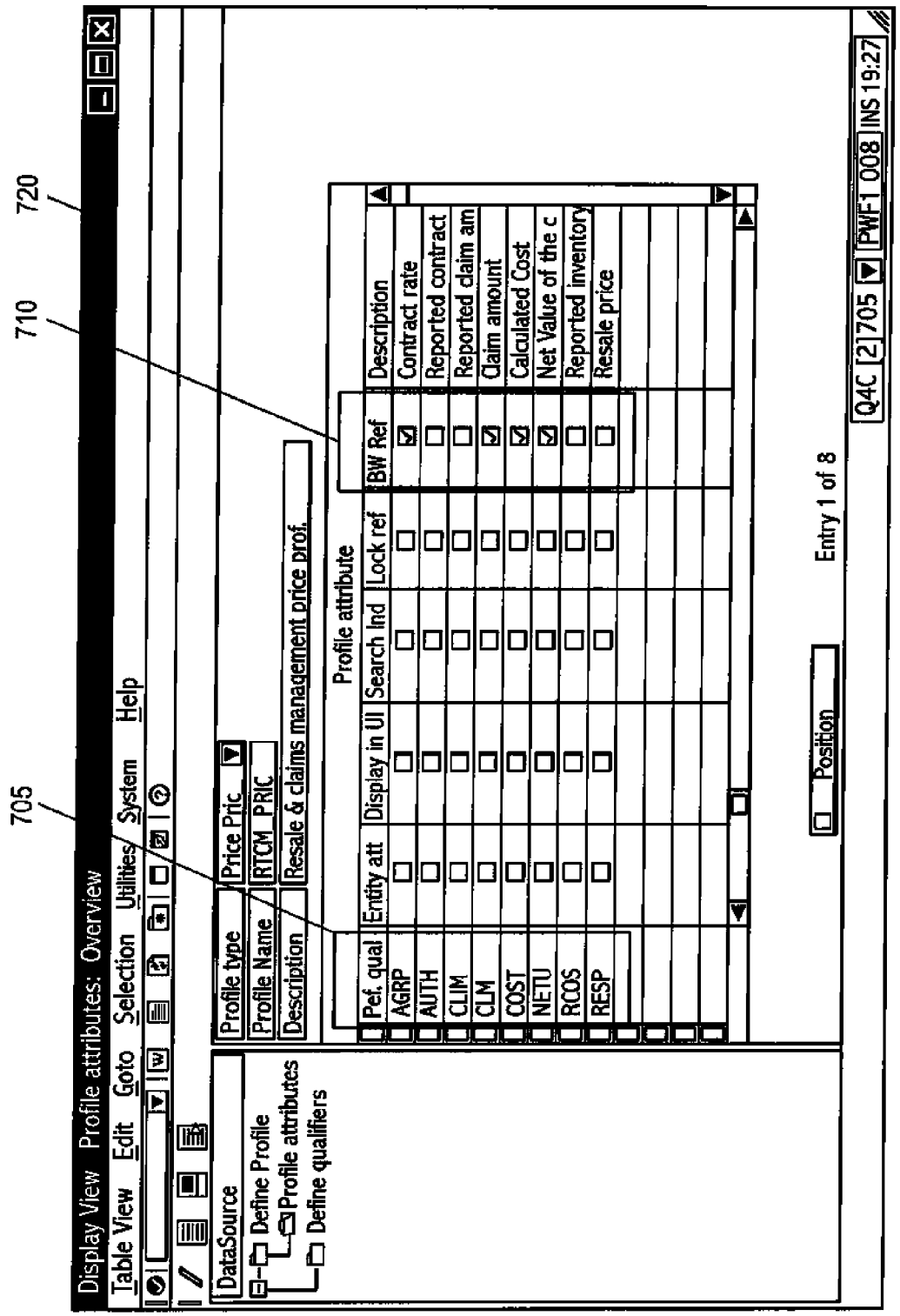
FIG. 7 shows a user interface provide by an application modeling environment to allow an application developer to specify particular qualifiers to be extracted to an analytics system.

FIG. 7 shows a user interface provide by application modeling environment 360 to allow application developer 350 to specify particular qualifiers to be extracted to analytics system 105. Application modeling window 720 shows profile qualifier field 705, which display particular profile qualifiers (see FIG. 6). Application modeling window 720 also includes BW Rel field 710, which allows application developer to select particular profile qualifiers for extraction to analytics system 105.

Figure 8:
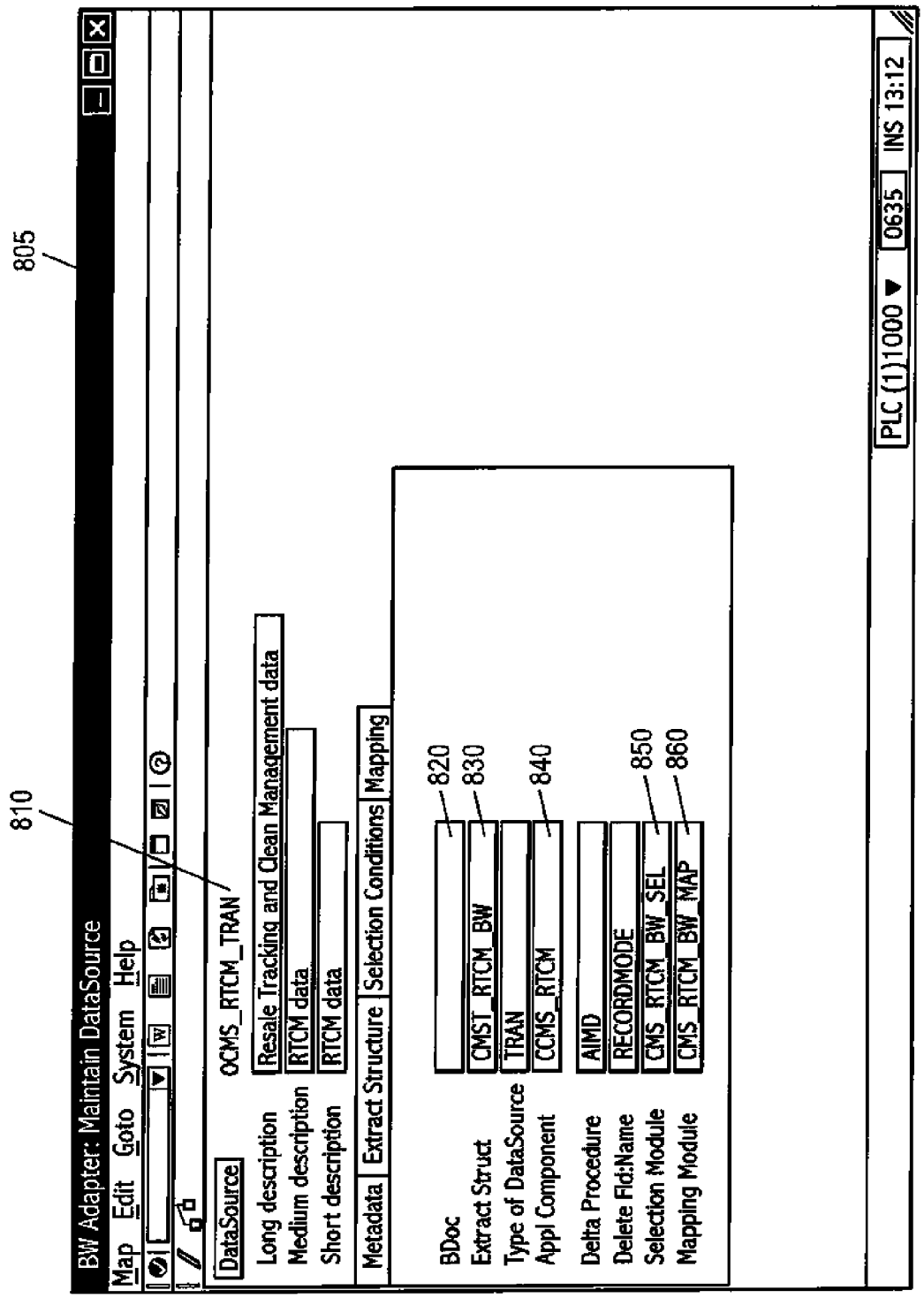
FIG. 8 is a user interface screen for establishing a data source definition record according to one embodiment of the present invention.

FIG. 8 is a user interface screen for establishing a data source definition record according to one embodiment of the present invention. Data source definition record 525 will include data source field 810, BDoc field 820, extraction structure field 830, application component field 840 and selection module field 850 and mapping module field 860.

Data source field identifies a name of the data source definition record. Extraction structure 830 identifies the name of the extraction data structure 320 generated by application generator 515. Application component 840 identifies the associated application component 209 for which data extraction is to occur. Selection and mapping modules 850 and 860 respectively identify the extraction and mapping modules (225, 227).

Normally, BDoc field 830 would identify a transaction data container type 205 for transmitting data from a transaction system 110 to analytics system 105. However, the present invention provides a method for extraction without the use of a transaction data container 205 and is left blank.

The following is an exemplary set of fields for inclusion in a data source definition record 525 according to one embodiment of the present invention.

| | |
|---|---|
| Data source | 0CMS_RTCM_TRAN |
| Extract Struct. | CMST_RTCM_BW |
| Type of DataSource | TRAN |
| Appl. Component | 0CMS_RTCM |
| Delta Procedure | AIMD |
| Delete Fld:Name | RECORDMODE |
| SelectionModule | CMS_RTCM_BW_SEL |
| Mapping Module | CMS_RTCM_BW_MAP |

A method and system for extraction of data to an analytics system has been described. The present invention provides a method for extraction of data from an application to an analytics system using a generic extraction data structure generated during application generation. This method eliminates the need for an event driven middleware approach and is thus suitable for environments in which large amounts of data are generated.

Several embodiments of the invention are specifically illustrated and/or described herein. However, it will be appreciated that modifications and variations of the invention are covered by the above teachings and within the purview of the appended claims without departing from the spirit and intended scope of the invention.

What is claimed is:

1. A method for extracting data from a software application to an analytics system comprising:
   generating a data structure by an application generator;
   detecting a save event at a transaction system;
   receiving extraction information at the transaction system based upon a data source definition record, wherein the data source definition record identifies a component associated with the software application containing data to be extracted, a selection module and a mapping module;
   identifying data to be extracted directly to the analytics system by the selection module based upon the extraction information;
   extracting the identified data from the identified component associated with the software application;
   mapping the data identified to be extracted into the data structure with the mapping module, wherein the mapping module performs transformation on data stored in the transaction system database into a form that is compatible with the analytics system;
   storing the extracted data into the data structure; and
   executing a multi-mode extraction framework including the data structure for storing the extracted data, wherein the extraction framework includes a full upload phase, a delta initialization phase and a delta upload phase,
      when the full upload phase is engaged, the extracted data is uploaded directly to the analytics system from the data structure,
      when the delta initialization phase is engaged, a queue is loaded with the extracted data to be uploaded to the analytics system from the data structure, and
      when the delta upload phase is engaged, the extracted data in the queue is uploaded.

2. The method according to claim 1, wherein the data structure is a complex data structure.

3. The method according to claim 2, wherein the complex data structure is transformed into a flat file structure.

4. The method according to claim 1, wherein the application is an online transaction processing ("OLTP") system.

5. The method according to claim 1, wherein the analytics system is an online analytics processing ("OLAP") system.

6. The method of claim 1, wherein the delta initialization extracts data that represents changes of the data previously uploaded.

7. The method of claim 6, wherein the full upload phase occurs prior to the delta initialization phase.

8. A system for extracting data from a software application to an analytics system comprising:
   a processor, the processor providing an application modeling environment for:
      generating a data structure by an application generator;
      detecting a save event at a transaction system;
      receiving extraction information at the transaction system based upon a data source definition record, wherein the data source definition record identifies a component associated with the software application containing data to be extracted, a selection module and a mapping module;
      identifying data to be extracted directly to the analytics system by the selection module based upon the extraction information;
      extracting the identified data from the identified component associated with the software application;
      mapping the data identified to be extracted into the data structure with the mapping module, wherein the mapping module performs transformation on data stored in the transaction system database into a form that is compatible with the analytics system;
      storing the extracted data into the data structure; and
      executing a multi-mode extraction framework including the data structure for storing the extracted data, wherein the extraction framework includes a full upload phase, a delta initialization phase and a delta upload phase,
 when the full upload phase is engaged, the extracted data is uploaded directly to the analytics system from the data structure,
 when the delta initialization phase is engaged, a queue is loaded with the extracted data to be uploaded to the analytics system from the data structure, and
 when the delta upload phase is engaged, the extracted data in the queue is uploaded.

9. The system according to claim 8, wherein the data structure is a complex data structure.

10. The system according to claim 9, wherein the complex data structure is transformed into a flat file structure.

11. The system of claim 8, wherein the delta initialization extracts data that represents changes of the data previously uploaded.

12. The system of claim 11, wherein the full upload phase occurs prior to the delta initialization phase.

13. A program storage device readable by a processor storing a program comprising instructions that, when executed by the processor, perform a method for extracting data from a software application to an analytics system comprising the steps of:
 generating a data structure by an application generator;
 detecting a save event at a transaction system;
 receiving extraction information at the transaction system based upon a data source definition record, wherein the data source definition record identifies a component associated with the software application containing data to be extracted, a selection module and a mapping module;
 identifying data to be extracted directly to the analytics system by the selection module based upon the extraction information;
 extracting the identified data from the identified component associated with the software application;
 mapping the data identified to be extracted into the data structure with the mapping module, wherein the mapping module performs transformation on data stored in the transaction system database into a form that is compatible with the analytics system;
 storing the extracted data into the data structure; and
 executing a multi-mode extraction framework including the data structure for storing the extracted data, wherein the extraction framework includes a full upload phase, a delta initialization phase and a delta upload phase,
  when the full upload phase is engaged, the extracted data is uploaded directly to the analytics system from the data structure,
  when the delta initialization phase is engaged, a queue is loaded with the extracted data to be uploaded to the analytics system from the data structure, and
  when the delta upload phase is engaged, the extracted data in the queue is uploaded.

14. The program storage device according to claim 13, wherein the data structure is a complex data structure.

15. The program storage device according to claim 13, wherein the complex data structure is transformed into a flat file structure.

16. The program storage device of claim 13, wherein the delta initialization extracts data that represents changes of the data previously uploaded.

17. The program storage device of claim 16, wherein the full upload phase occurs prior to the delta initialization phase.

18. A computer-readable storage medium storing a generic extraction framework for extracting data generated by an application directly to an analytics system comprising:
 a generic extraction class, the generic extraction class providing services for population of a complex data structure as a function of transaction data generated by the application based upon a data source definition record, wherein the data source definition record identifies a component associated with the application containing data to be extracted;
 a mapping module, the mapping module to identify the transaction data to be extracted into the complex data structure and to transform the transaction data stored in a transaction system database into a form that is compatible with the analytics system;
 a data handler configured to transport data stored in the complex data structure to a buffer for uploading to the analytics system;
 an extraction data structure, comprising a complex data type; and
 an event handler configured to detect a generation of transaction data by the application and to invoke at least one method of the generic extraction class;
 wherein the event handler executes a multi-mode extraction framework, wherein the extraction framework includes a full upload phase, a delta initialization phase and a delta upload phase,
  when the full upload phase is engaged, the extracted data is uploaded directly to the analytics system from the data structure,
  when the delta initialization phase is engaged, a queue is loaded with the extracted data to be uploaded to the analytics system from the data structure, and
  when the delta upload phase is engaged, the extracted data in the queue is uploaded.

19. The computer-readable storage medium of claim 18, wherein the buffer is a queue.

20. The computer-readable storage medium of claim 19, wherein the complex data structure is compatible with a data container designed to utilize a middleware for a transmission of transaction data from the application to the buffer.

21. The computer-readable storage medium of claim 20, wherein the generic extraction class invokes at least one method call to a service expecting a passing of a transaction data container, but instead passes the complex data structure.

* * * * *